United States Patent Office 2,728,764
Patented Dec. 27, 1955

2,728,764

PENICILLIN SALTS OF N-BENZHYDRYL-DIISOPROPYLAMINE

Joseph Thomas Alberi, Jamesville, N. Y., assignor to Bristol Laboratories Inc., Syracuse, N. Y., a corporation of New York No Drawing. Application August 15, 1952,
Serial No. 304,654

2 Claims. (Cl. 260—239.1)

The present invention relates to a new, non-toxic, water-insoluble, amine salt of penicillin, more particularly a penicillin salt of N-benzhydryl-diisopropylamine, which is capable of exerting a repository antibiotic action and is also useful for oral, therapeutic administration and for external application and for use as a supplement in animal and poultry feeds.

The new penicillin salt of the present invention has the following formula

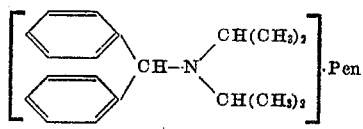

wherein Pen designates an acid penicillin radical or an active moiety thereof, capable of forming an addition salt with N-benzhydryl-diisopropylamine.

The product of the present invention may be obtained by reaction of penicillin acid with N-benzhydryl-diisopropylamine in a water-immiscible organic solvent and by the metathetical reaction of a water-soluble penicillin salt and a water-soluble salt of N-benzhydryl-diisopropylamine in water.

A more comprehensive understanding of this invention is obtained by reference to the following examples.

EXAMPLE I
*N-benzhydryl-diisopropylamine*

A solution of di-isopropylamine (253 grams; 2.5 moles) and benzhydryl bromide (347 grams; 1.0 moles) in 500 ml. xylene is stirred and refluxed for eighty-eight hours. The temperature of the mixture varies from about 110° C. to 145° C. After the addition of 500 ml. water, any undissolved solid (which may be tetraphenylethane) is removed by filtration from the separated xylene layer. The xylene filtrate is stirred with 400 ml. of 6 N HCl and, on cooling, the crude product melting at about 165°–168° C. is collected by filtration, dissolved in two liters of boiling water, and partially decolorized with charcoal. Two hundred milliliters of 12 N HCl is added to the hot, aqueous filtrate from charcoal and on chilling there is recovered a solid product. This salt is shaken with 10% KOH and several portions of ether until all solid has dissolved. The ethereal extracts are separated from the aqueous phase, combined, shaken with saturated NaCl solution and filtered through anhydrous Na₂SO₄. Distillation then yields N-benzhydrylisopropylamine as a light yellow oil, B. P. 134°–150° C./1 mm. and $n_D^{26}$ about 1.5486.

EXAMPLE II
*Salt of penicillin G and N-benzhydryl-diisopropylamine*

N-benzhydryl-diisopropylamine hydrochloride (0.9 g.) is suspended in 5 cc. water and added to a solution of 0.2 grams of sodium penicillin G in 6.0 cc. water. Upon scratching and cooling, the crystalline salt of penicillin G and N-benzhydryl-diisopropylamine precipitates and is collected by filtration. This salt has a potency of about 980 units/mgm. and is soluble in water at room temperature to the extent of about 520 units/ml.

EXAMPLE III

Potassium penicillin G (18.6 g.; 0.05 mole) is shaken with 75 ml. of 8.5% phosphoric acid and 150 ml. of ether in the cold until two clear layers result. The aqueous layer is withdrawn and discarded. The ether solution is filtered and then added all at once to a cold solution of 0.04 moles (10.7 g.) of N-benzhydryl-diisopropylamine in 50 ml. of ether. Crystalline penicillin G salt of N-benzhydryl-diisopropylamine precipitates and is collected by filtration.

EXAMPLE IV

Ten grams of sodium penicillin G is dissolved in 30 ml. distilled water, acidified to pH 2 with concentrated phosphoric acid, and extracted with 48 ml. of amyl acetate and the aqueous layer is discarded. The amyl acetate is dried over sodium sulfate and then added to 6.4 g. N-benzhydryl-diisopropylamine in 30 ml. of anhydrous ether. After cooling overnight in the ice-box, the crystalline salt of penicillin G and N-benzhydryl-diisopropylamine precipitates and is separated by filtration. This salt is soluble in water at room temperature to the extent of about 520 Oxford units/ml. and in one assay, a 1 mgm./ml. sample in 60% acetone showed a potency of about 1022 units/mgm. This salt melts at about 130° C.–131° C.

While the present invention has been described with particular reference to the N-benzhydryl-diisopropylamine salt of penicillin G it will be understood that the N-benzhydryl-diisopropylamine salts of other penicillins are also included within the scope of this invention. For instance, penicillins such as the penicillins G, F, X, dihydro F, O and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl isobutyl ketone, methylene dichloride, ethylene dichloride and chloroform. Recovery of the product may be increased by evaporating the solvent in vacuo at low temperatures.

It will be understood also that the ethereal solution of the free base may be prepared in ether by the use of caustic to liberate the free amine from an organic-solvent soluble or water soluble salt such as the hydrochloride, phosphate, nitrate, hydrobromide, sulfate, citrate, acetate, and tartrate.

The compound of the present invention is a therapeutically effective veterinary compound and is useful in treating diseases in animals caused by penicillin susceptible organisms.

It will be understood that, without departing from the spirit of the invention or the scope of the claims, various modifications may be made in the specific expedients described as these are illustrative only.

I claim:

1. A salt of penicillin and N-benzhydryl-diisopropylamine.

2. A salt of penicillin G and N-benzhydryl-diisopropylamine.

References Cited in the file of this patent

UNITED STATES PATENTS 2,515,898    Rhodehamel _____ July 18, 1950

FOREIGN PATENTS 645,037    Great Britain _____ Oct. 25, 1950